United States Patent
Morita, Jr. et al.

(10) Patent No.: US 7,049,813 B2
(45) Date of Patent: May 23, 2006

(54) MOTOR STATE COUNTING

(75) Inventors: William K. Morita, Jr., North Hollywood, CA (US); Raymond Y. Liu, Monterey Park, CA (US); Estella C. Chung, West Hills, CA (US)

(73) Assignee: HR Textron Inc., Santa Clarita, CA (US)

( * ) Notice: Subject to any disclaimer, the term of this patent is extended or adjusted under 35 U.S.C. 154(b) by 140 days.

(21) Appl. No.: 10/848,654

(22) Filed: May 19, 2004

(65) Prior Publication Data

US 2005/0152489 A1    Jul. 14, 2005

Related U.S. Application Data

(60) Provisional application No. 60/535,302, filed on Jan. 9, 2004.

(51) Int. Cl.
*G01R 33/07* (2006.01)
*B01B 7/30* (2006.01)

(52) U.S. Cl. .................. 324/251; 324/207.25
(58) Field of Classification Search .......... 324/251, 324/207.25
See application file for complete search history.

(56) References Cited

U.S. PATENT DOCUMENTS

| | | | |
|---|---|---|---|
| 5,663,616 | A | 9/1997 | Stringfellow et al. |
| 6,051,943 | A | 4/2000 | Rabin et al. |
| RE36,860 | E | 9/2000 | Muller |
| 6,353,299 | B1 | 3/2002 | Ramachandran et al. |
| 6,424,928 | B1 | 7/2002 | Elliott et al. |
| 6,614,156 | B1 | 9/2003 | Oda et al. |

*Primary Examiner*—Bot Ledynh
(74) *Attorney, Agent, or Firm*—Lesley A. Hamlin

(57) ABSTRACT

Systems, methods, and computer-readable media are disclosed for error-compensated counting of Hall states for motor position feedback and/or commutation. An indicated Hall state is detected by digital Hall state sensors and a duration of the Hall state is compared to a specified time period. When the duration exceeds the specified time period, the indicated Hall state is compared to one or more valid Hall states and a position counter is changed for valid states. When the indicated Hall state is invalid, the position counter is not changed. The Hall state sensors may be connected to logic means and may detect the position of a rotor of a permanent magnet motor relative to a stator. When noise induces a change in an indicated Hall state, corresponding noise-induced effects on the position counter may be may be removed through error-compensated counting.

21 Claims, 9 Drawing Sheets

400

MOTOR STATE COUNTING

This application claims the benefit of U.S. Provisional Application No. 60/535,302, filed Jan. 9, 2004, the contents of which are incorporated herein by reference.

BACKGROUND

Semiconductor sensors that sense the presence or movement of a magnetic field are commonly referred to as "Hall effect" or "Hall" sensors. Hall sensors have many applications. For example, Hall effect sensors are commonly used in brushless direct current (DC) motor applications for two purposes—to commutate the motor and to provide motor position feedback. Hall sensors are solid state devices and accordingly have no moving parts to wear out. Use of Hall sensors may consequently minimize maintenance requirements and improve longevity for various applications, such as for brushless DC motors.

A digital Hall sensor is a Hall sensor with certain signal conditioning circuitry that produces an output that is one of two states that represent digital values of 1 or 0. The signal conditioning components and/or circuitry may include a low noise, high input impedance differential amplifier, and a threshold or trigger stage. The trigger stage triggers one of the digital output values when the output of the Hall element crosses a certain threshold value. The digital output state of the Hall sensor will not change unless the input value has crossed the particular set threshold value. The trigger stage is commonly a Schmitt trigger or Schmitt inverter.

The digital Hall sensor signal conditioning circuitry may also include an output transistor, e.g., a current sinking NPN transistor. The digital Hall sensor output may be defined or characterized by the electrical characteristics of the output transistor, which may include the type of the output transistor, e.g., NPN, the maximum current, the breakdown voltage, and the switching time. The current sinking output transistor may be configured in an open collector configuration. In some applications, the output of the output transistor may be floating and a pull-up resistor may be used to help establish a solid quiescent voltage level.

FIG. 1 shows a representative brushless DC motor 100 including a rotor 101 with multiple rotor magnets, e.g., permanent magnets 102a–102d having alternating north and south pole orientations, mounted on an accessory shaft 104 having a non-driven end 104a and a driven end 104b. For an 8-pole application, four corresponding rotor magnet pairs (omitted for clarity) would normally be mounted around the hidden side of the accessory shaft 104. Stator windings 106 are shown surrounding the rotor 101 and rotor magnets 102a–102d. The stator windings 106 may be mounted on the inside of a motor housing (not shown).

To rotate the rotor 101, the stator windings 106 are energized in a sequence. The rotor position relative to the stator determines the order in which the windings will be energized so that the rotor moves in a desired direction, e.g., clockwise (CW) or counter clockwise (CCW). The rotor position is sensed using one or more Hall sensors, for example, Halls sensors 110a–110c, as shown. For the commutation sequence, a first winding is typically energized to positive power, i.e., with current entering into the winding, and a second winding is negative, i.e., with current exiting the winding, while a third winding is in a non-energized condition. For subsequent steps in the commutation sequence, the windings are energized accordingly to cause the rotor to spin within the stator.

The Hall sensors 110a–110c are mounted on a stationary part of the motor 100, e.g., on the inner periphery of the stator. The Hall sensors 110a–110c may be mounted to detect the movement of the rotor magnets 102a–102d or, in certain applications, to detect the movement of optional Hall sensor magnets 112a–112d (with four omitted for clarity) that are scaled-down versions of the rotor magnets. Hall sensor magnets 112a–112d are typically mounted to the accessory shaft 104 away from the driven end 104b of the shaft. The Hall sensors 110a–110c are commonly mounted on a printed circuit board and may be fixed to an enclosure cap on the non-driven end of the rotor 101. A controller 114 may be used to control the energizing sequence of the windings 106 and to keep the motor 100 running at a desired speed and in a desired direction.

FIG. 2 shows the combined output, or digital values, produced by three digital Hall sensors 202a–202c. The combined output is indicated by three Hall lines 204a–204c and is shown for rotation angles over a single rotation of a typical prior art 8-pole brushless DC motor application, e.g., motor 100 in FIG. 1. The Hall sensors 202a–202c may, for example, correspond to Hall sensors 110a–110c in FIG. 1, and may be placed 30 degrees apart relative to rotor 101. A Hall state transition occurs in the combined output when the digital state of one of the Hall lines, e.g., 204a, changes in value, for example from a 0 to a 1 as shown in FIG. 2 at 30 degrees of rotation.

During operation of the motor, e.g., motor 100, the rotating permanent magnet rotor moves across the front of each digital Hall sensor 202a–202c and causes the sensor to change state. Each digital Hall sensor 202a–202c operates as a particular pole, e.g., a south pole, of a rotor or Hall sensor magnet passes that particular sensor, triggering a digital state, e.g., either 1 or 0. When an opposite pole, e.g., a north pole, passes the same digital Hall sensor, that sensor may release, triggering the complementary digital state, i.e., 0 or 1. For the Hall output sequence shown in FIG. 2, 24 state counts are produced in a 360-degree motor rotation, i.e., six distinct hall states times four cycles.

For the prior art output 204a–204c shown in FIG. 2, noise may cause the output 204a–204c to indicate an erroneous or false Hall state transition, i.e., a transition to a false Hall state that does not correspond to actual movement of the rotor and magnets. When digital Hall sensors are used for motor position feedback and commutation, a noise-induced Hall state transition may indicate a false position of the rotor, which can lead to faulty commutation and degradation in motor performance.

SUMMARY OF THE INVENTION

Embodiments of the present invention are directed to methods, computer-readable media, and systems for noise-compensated or error-compensated counting of Hall states for motor position feedback and/or commutation in brushless DC motor applications.

One embodiment of the present invention may include a method of error-compensated counting of Hall states for position feedback, wherein compensation is made for noise-induced Hall state changes. The method may include comparing a duration of an indicated Hall state to a specified or threshold time period. The indicated Hall state may be compared to one or more valid Hall states when the duration is greater than the specified or threshold time period. A Hall state change pulse may be generated and a position counter may be changed. The method may include a step of determining a motor direction associated with the indicated Hall state.

A second embodiment may include a method of incrementing a position counter including the steps of detecting an indicated Hall state from a plurality of digital Hall effect sensors and detecting a duration of the indicated Hall state. The duration may be compared to a specified time period and the indicated Hall may be compared to one or more valid Hall states, in the event that the duration is greater than the specified time period. A step of determining whether the indicated Hall state corresponds to a valid Hall state may be included. The indicated Hall state may be determined to correspond to a first direction or a second direction relative to a previous Hall state. A position counter may be changed in response to determining that the indicated Hall state corresponds to the first direction or the second direction. The indicated Hall state may be ignored, in the event that the indicated Hall state corresponds to an invalid Hall position or the duration is less than the specified time period.

A third embodiment may include a computer-readable medium having computer-executable instructions stored thereon to perform the steps of detecting an indicated Hall state from a plurality of Hall effect sensors. The computer-readable medium may include instructions for detecting a duration of the indicated Hall state. The duration of the indicated Hall state may be compared to a specified time period and to one or more valid Hall states, in the event that the duration is greater than the specified time period. The indicated Hall state may be determined to correspond to a valid Hall state and to a first direction or a second direction relative to a previous Hall state. A position counter may be changed in response to determining that the indicated Hall state corresponds to the first direction or the second direction. The indicated Hall state may be ignored, in the event that the indicated Hall state corresponds to an invalid Hall position or the duration is less than the specified time period.

A fourth embodiment may include a system for incrementing a position counter. The system may include a plurality of Hall state sensors, with each Hall state sensor being operable to produce at least one binary value. Logic means may be included for determining a valid Hall state made up of the at least one binary value and for changing a position counter. The logic means may be operable to (a) receive the at least one binary value from the plurality of Hall state sensors, (b) detect an indicated Hall state, (c) detect a duration of the indicated Hall state (d) compare the duration to a specified time period, (e) compare the indicated Hall state to one or more valid Hall states, (e) determine whether the indicated Hall state corresponds to a valid Hall state, (f) determine whether the indicated Hall state indicates a first direction or a second direction relative to a previous Hall state, (g) change a position counter in response to determining that the indicated Hall state indicates the first direction or the second direction, and (i) ignore the indicated Hall state in the event that the indicated Hall state corresponds to an invalid Hall position or the duration is less than the specified time period.

BRIEF DESCRIPTION OF THE DRAWINGS

These and other features, aspects, and advantages of the present invention will become better understood with regard to the following description, appended claims, and accompanying drawings. The drawings are not necessarily to scale, emphasis instead being placed on illustration of principles of the invention. The drawings include the following figures:

DETAILED DESCRIPTION

The present invention may be understood by the following detailed description, which should be read in conjunction with the attached drawings. The following detailed description of certain embodiments is by way of example only and is not meant to limit the scope of the present invention.

Embodiments of the present invention are directed to methods, computer-readable media, and systems for noise-compensated or error-compensated counting of Hall states for motor position feedback and/or commutation in brushless DC motor applications.

Figure 1:
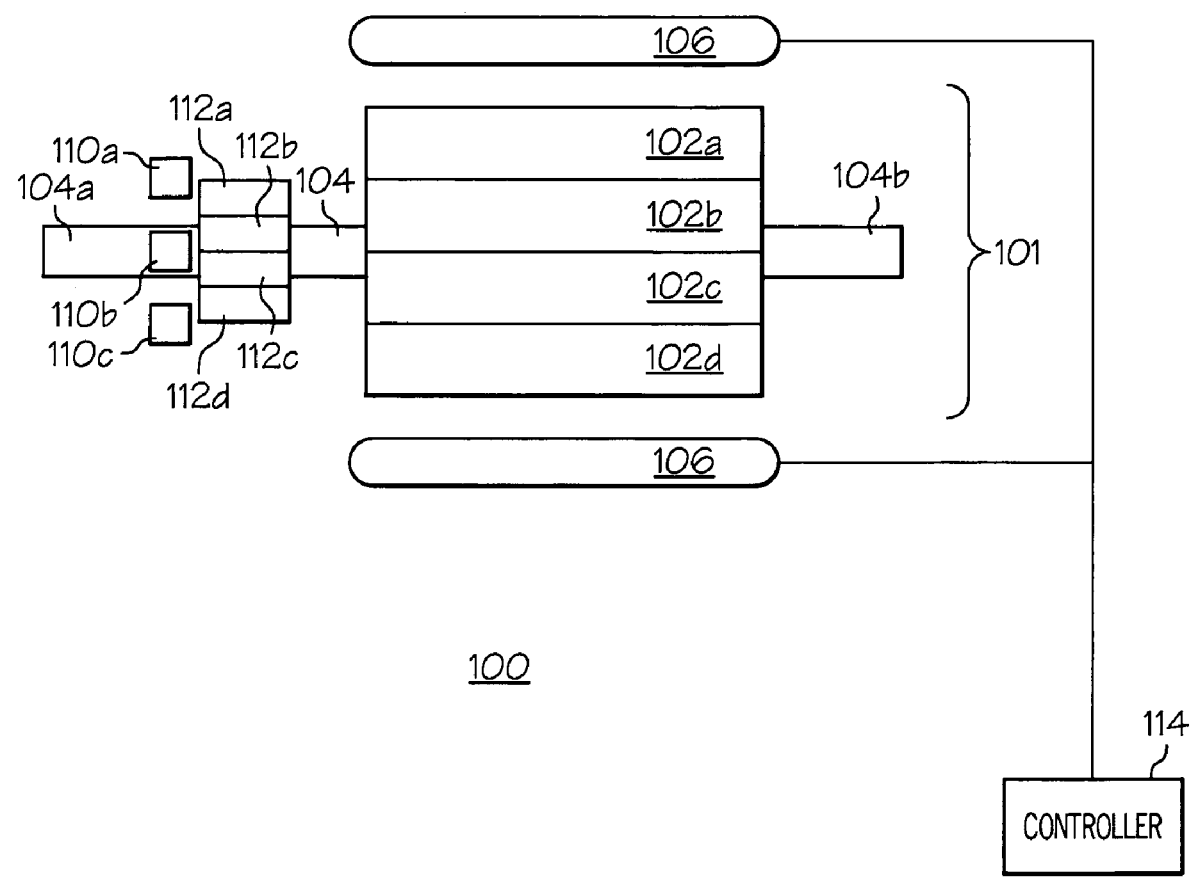
FIG. 1 shows an 8-pole brushless DC motor of the prior art.
Figure 2:
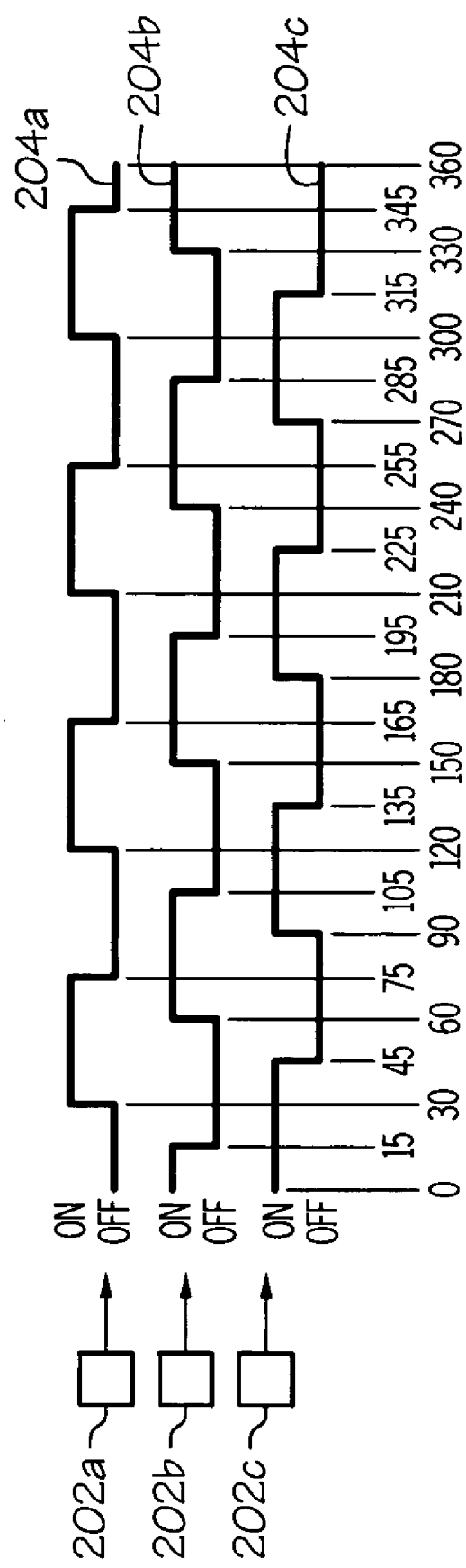
FIG. 2 shows a combined Hall sensor output and associated Hall states for three digital Hall sensors used in an 8-pole brushless DC motor of the prior art.
Figures 3A, 3B:
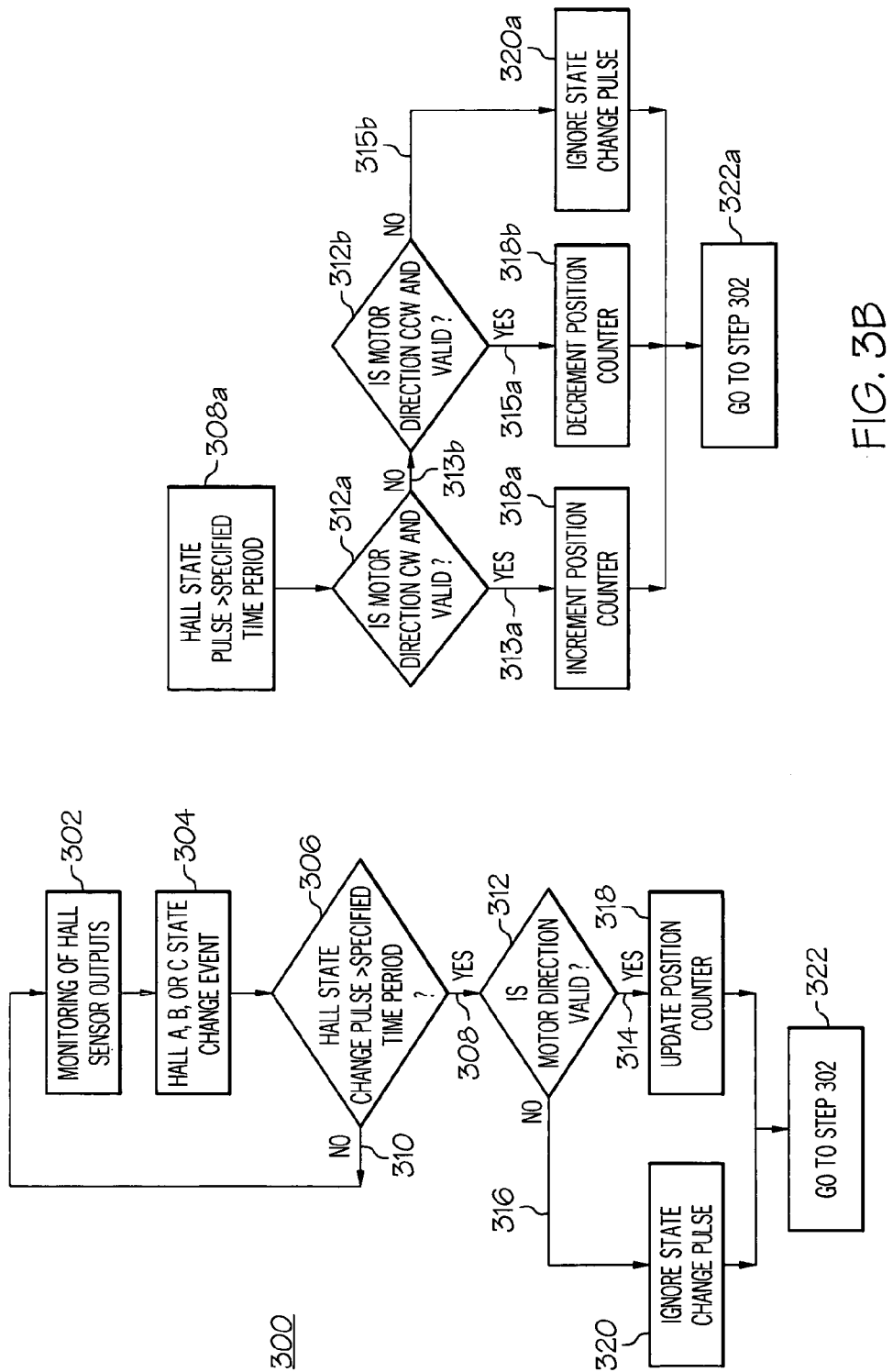
FIG. 3 includes FIGS. 3A and 3B, which are flow charts for a motor state counting method 300 according to embodiments of the present invention.

FIG. 3 includes FIGS. 3A and 3B, which are flow charts for a motor state counting method 300 according to embodiments of the present invention. With reference to FIG. 3A, a combined digital Hall sensor output including digital Hall states produced by a number of digital Hall sensors used with a brushless DC motor may be periodically monitored 302 for a change in value or state to determine whether a Hall state transition or Hall state change pulse has occurred. A combined digital Hall sensor output may have a particular number of digits, depending on the number of Hall sensors used.

For example, for a brushless DC motor having an even number of poles, e.g., 8, used with three Hall sensors placed 30 degrees apart, the Hall sensor output lines would indicate Hall state change pulse when the combined digital Hall sensor output transitions from a pair of 0's to a pair of 1's in any two of the three Hall lines. Such transition would occur as the rotor and rotor magnets of the brushless DC motor spin within the stator. An example of a Hall state transition for this situation would be a transition from a "100" Hall state, i.e., a digital value that includes a pair of 0's, to a "110" Hall state, i.e., a digital value that includes a pair of 1's.

When a Hall state transition or Hall state change pulse occurs 304 in any Hall line, e.g., in any of the three Hall lines, Hall A, Hall B, or Hall C indicated at step 304, the duration of the transition or change pulse is compared 306 to a specified time period to determine if the change pulse is a "real" transition or a noise-induced error or glitch. The Hall state transition or change pulse is not recognized 310 if it does not last more than the specified time period and the monitoring of the combined Hall sensor output may be continued at 302. The specified time period may be of any desired duration, e.g., 500 nanoseconds (ns). Appropriate logic means, including, but not limited to a logic circuit, central processing unit (CPU), and/or digital signal processor (DSP) may perform the comparison at step 306.

If the comparison at 306 indicates that the duration of the Hall state transition is greater than the specified time period at 308, the new Hall state is determined to be "real", in the sense that the new Hall state is recognized and is ready to be processed by the state counting method 300. Following 308, a motor direction validity comparison 312 is made to determine whether the new Hall state change pulse corresponds to a valid motor movement. A new Hall state may be considered valid when it matches one of a known set of valid Hall state sequence values that correspond to Hall sensor output values for movement of a particular brushless DC motor. If the new Hall state is a valid Hall state at 314, a state change count pulse is generated and a position counter is updated 318. Examples of valid Hall states corresponding to a brushless DC motor with three Hall sensors are listed in Table 1.

Returning to the motor direction validity comparison step 312, if the motor direction is determined to be invalid at 316, then the Hall state change pulse is ignored 320 and the position countered remains at the current value. The monitoring of the Hall sensor outputs may be continued 322 after the position counter is updated 318 or alternatively when the Hall state change pulse is ignored 320 and no state change count pulse is generated.

Referring to FIG. 3B, an alternate embodiment for a motor direction validity comparison is shown. A motor direction validity comparison, e.g., such as step 312 in FIG. 3A, may be divided into sub steps 312a and 312b for CW and CCW directions, respectively. If a Hall state transition occurs and the duration of the new Hall state last longer than the time specified at step 308a, the new Hall state may be compared 312a to a stored value of the previous Hall state to determine if the new Hall state corresponds to a valid CW motor movement or direction. If the new Hall state corresponds to a valid CW motor direction at 313a, the position counter may be incremented 318a.

Returning to the comparison at 312a, if the new Hall state does not correspond at 313b to a CW direction, the new Hall state may be compared 312b to the previous Hall state to determine if the new Hall state corresponds to a valid CCW motor movement or direction. If the new Hall state is valid and indicates a CCW direction at 315a, the position counter may be decremented 318b. If the comparison at 312b does not indicate a valid CCW movement or direction at 315b, the Hall state change pulse is ignored 320a and no state change count pulse is generated. The monitoring of the Hall sensor outputs may be continued 322a when the position counter is incremented 318a or decremented 318b, or when the Hall state change pulse is ignored 320a. In certain embodiments, the new Hall state may be compared to a CCW direction before being compared to a CW direction.

As described previously, when a new Hall state lasts longer than the specified time period at comparison 306, the new Hall state may be compared with the previous Hall state to determine if the motor moved in a valid direction. Valid Hall states corresponding to motor positions and previous Hall states for one embodiment with three Hall sensors are shown in Table 1, with the direction of motor movement being indicated.

TABLE 1

Valid Hall States

| Hall State | Prev. Hall | Motor Direction CW = 1, CCW = 0 | VALID Valid = 1 |
|---|---|---|---|
| 100 | 101 | 1 | 1 |
| 110 | 100 | 1 | 1 |
| 010 | 110 | 1 | 1 |
| 011 | 010 | 1 | 1 |
| 001 | 011 | 1 | 1 |
| 101 | 001 | 1 | 1 |
| 100 | 110 | 0 | 1 |
| 110 | 010 | 0 | 1 |
| 010 | 011 | 0 | 1 |
| 011 | 001 | 0 | 1 |
| 001 | 101 | 0 | 1 |
| 101 | 100 | 0 | 1 |
| All Other | Conditions | 0 | 0 |

Referring to Table 1, the validity of a new Hall state may be determined, e.g., as at step 312, by comparing the new Hall state to the previous Hall state. For the case that a positive increment value or command is assigned to a clockwise (CW) direction of the motor, a state change count pulse would be generated, and the position counter would be incremented, e.g., step 318a in FIG. 3B, as for example, when a Hall state transition is detected that indicates CW motor rotation, e.g., the new Hall state is "110" and the previous Hall state was "100". In one embodiment, a CW sequence of Hall state values from a combined digital Hall sensor output is "100, 110, 010, 011, 001, 101", as indicated by the top six rows in the left hand column of the Table 1. In certain embodiments, a negative decrement value may be assigned to a CW direction and a positive increment value may be assigned to a CCW direction.

For the case that a negative decrement value or command is assigned to a counter clockwise (CCW) motor rotation, a state change count pulse would be generated for a real Hall state transition and the position counter would be decremented, e.g., at step 318b in FIG. 3B, when the new Hall state indicates a CCW rotation of the motor. In one embodiment, a counter clockwise ("CCW") sequence is "100, 101, 001, 011, 010, 110", as indicated by rows 7–12 in the left hand column of Table 1.

If the new Hall state is compared, e.g., at step 312 in FIG. 3A, against the previous Hall state, e.g., as shown in Table 1, and the new Hall state is considered invalid 316, the Hall state change pulse is ignored 320. When the Hall state change pulse is ignored 320, a state change count pulse is not generated and the position counter is not changed, i.e., is not incremented or decremented. As described above, Hall states "000" and "111" are invalid or "illegal" Hall states and are included in the "All Other Conditions" row in Table 1. Neither Hall state would normally be counted in the positive (CW) or negative (CCW) direction during position feedback or commutation for a brushless DC motor.

The method 300 shown in FIG. 3 may be implemented or stored as a motor state counting algorithm in appropriate logic means or circuitry, e.g., in instructions in computer-readable software, firmware, and/or hardware. In certain embodiments, suitable logic means including the motor state counting algorithm may be included in or operate in conjunction with a controller of a brushless DC motor.

Figure 4:
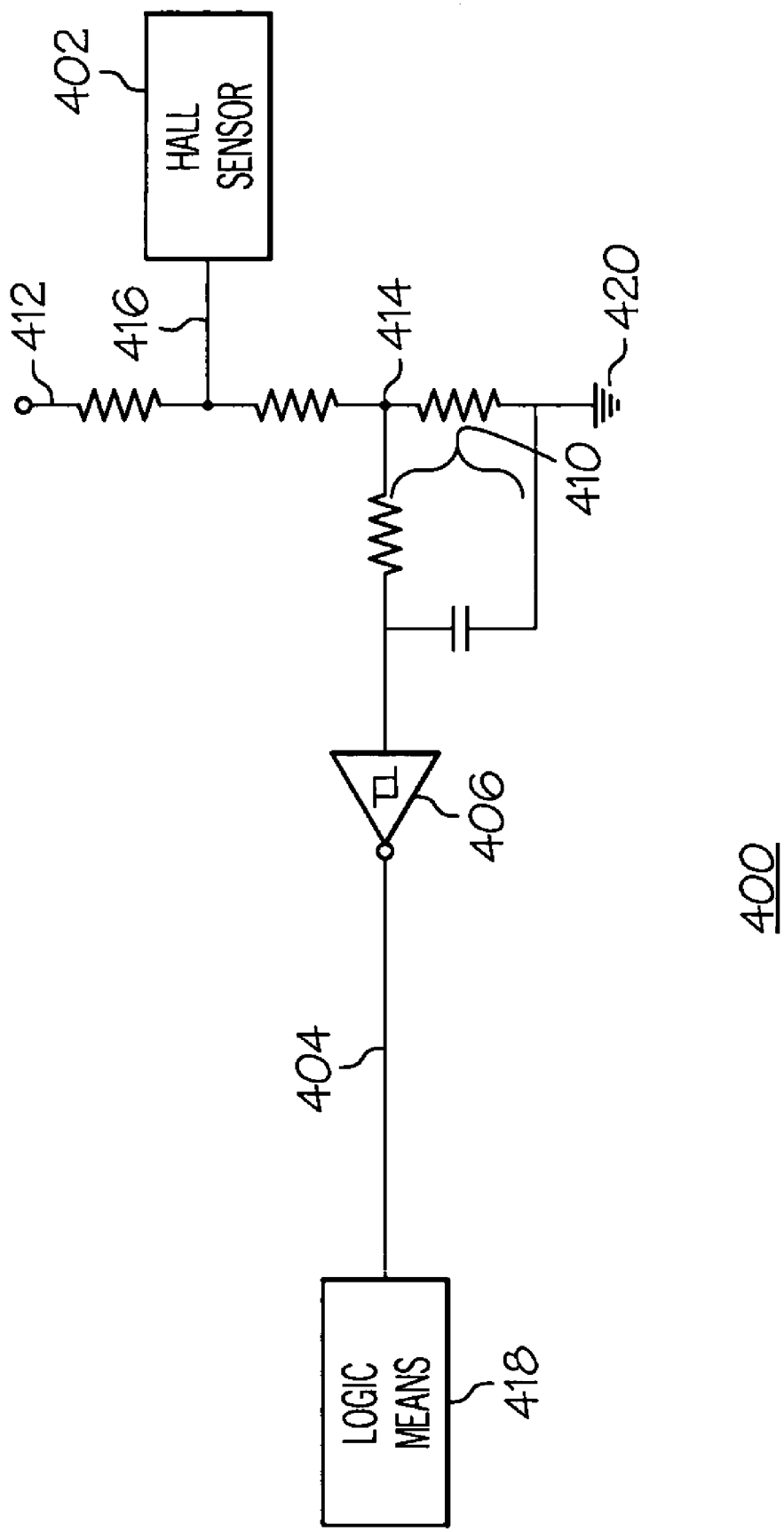
FIG. 4 shows a Hall digital sensor and sensor interface circuit of one embodiment of the present invention.

FIG. 4 shows a digital Hall sensor and sensor interface circuit 400 of one embodiment of the present invention. The interface circuit 400 may include a Hall sensor 402 and may interface at interface circuit output 404, to a logic means 418, e.g., a logic circuit, used for the control of a brushless DC motor. The Hall sensor 402 may include a Hall sensor output transistor. Logic means 418 may receive signals from a desired number of interface circuit outputs 404. In certain embodiments, for example, logic means 418 may receive as Hall inputs, signals from three interface circuit outputs 404. The logic means 418 may be any suitable type, including, for non-limiting example, a digital signal processor (DSP), a field programmable gate array (FPGA), a programmable logic controller (PLC), a computer, a central processing unit, etc.

An analog-to-digital (A/D) converter may be used to sample the interface circuit output as a discrete component or as part of the logic means 418. The Hall sensor interface circuit 400 may include a trigger stage, such as for example, a Schmitt trigger or Schmitt inverter 406 with output at 404. A power supply connection at 412 may supply power to the interface circuit 400. Interface circuit 400 may include a ground (GND) 420, for example, at the location indicated in FIG. 4. Suitable voltages for the Hall sensor operation typically range from approximately 4 to 24 Volts. Current requirements for the Hall sensor typically range from 5 to 15 milli-Amps (mA). In certain embodiments, the Hall sensor 402 may be configured as open-collector type sensor.

The Hall sensor output voltage 416 may, for example, be pulled up to 11.8V and down to ground (GND), in certain embodiments. The Hall sensor output voltage 416 may be divided by a voltage divider 414, for example, down to a range of 2.88V and GND, in certain embodiments, to help improve the signal to noise ratio, since any noise injected into the Hall sensor output voltage 416 signal will also be divided down by about one-fourth the original magnitude. The Hall sensor output 416 signal may also be sent through a low pass filter 410 to the Schmitt inverter 406. The low pass filter 410 may be optimized for the maximum allowable delay based on the maximum motor speed of a particular brushless DC motor. In certain embodiments, the low pass filter 410 may have a corner frequency set at 11.37 kHz. For example, with an 8-pole motor having a maximum speed of 21,600 RPM, the maximum Hall state count frequency is approximately 8,640 states/sec. The minimum state pulse would therefore be 115 µs, in which case a low pass filer with a corner frequency of 11.37 kHz could effectively filter out high-frequency noise.

The Hall effect sensor output 416 may have a low impedance that is minimized based on the current sinking capability and margin of the Hall sensor output transistor 402. The lower the impedance at 416, the higher the energy required for noise to be injected into the Hall signals at 416. In certain embodiments, when the Hall sensor output transistor 402 is ON, the interface circuit 416 is actively being driven to ground. The noise susceptibility of the interface circuit 400 is therefore very low because the Hall sensor output impedance is very low. Under most operational conditions, noise that is injected into the interface circuit at 416 will be injected when the Hall sensor output transistor 402 is OFF and the voltage 416 on the corresponding Hall line is pulled high through an associated pull-up resistor.

Figure 5:
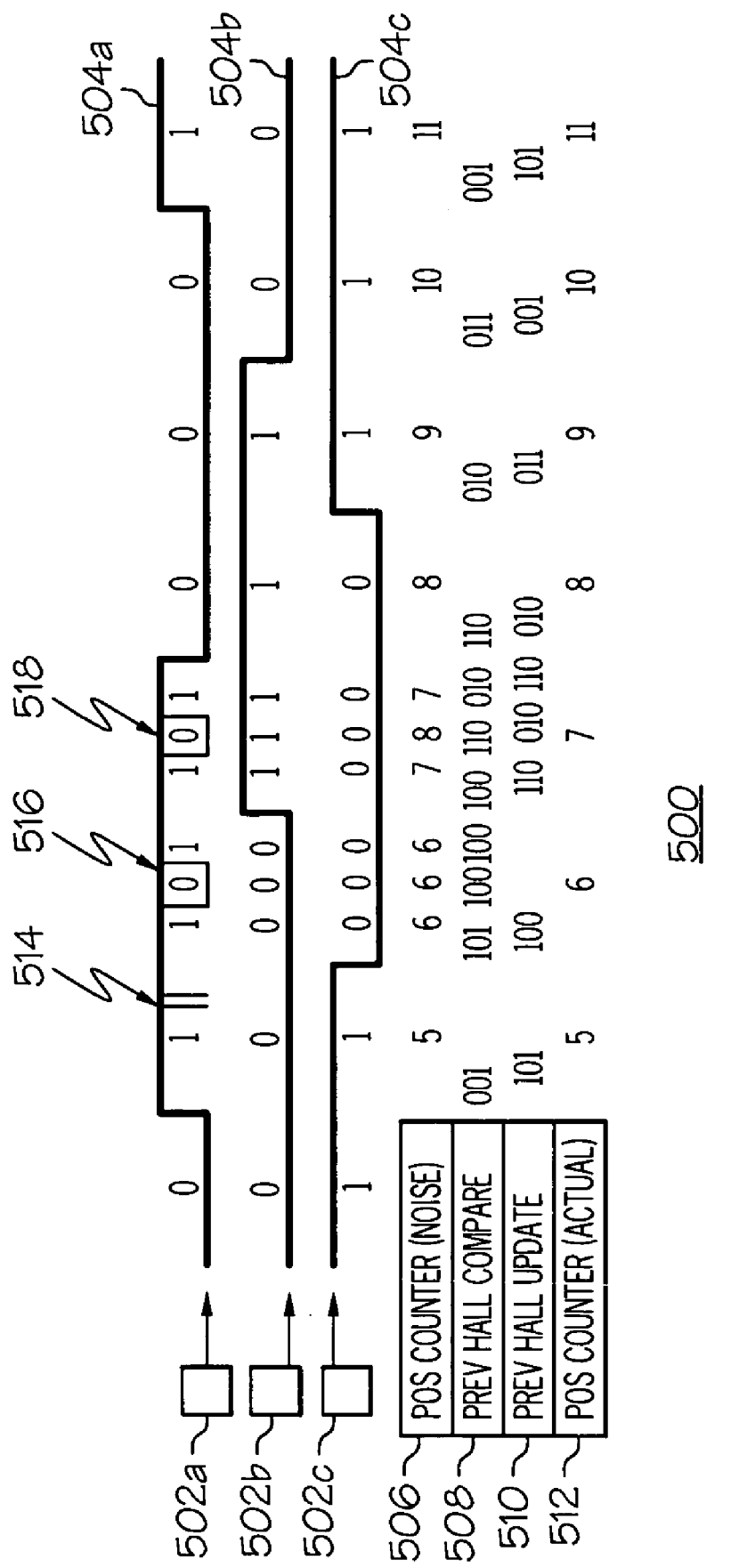
FIG. 5 shows a combined digital Hall sensor output from three Hall lines for noise injection in one Hall line between transitions.

FIG. 5 shows three digital Hall sensors 502a–502c and their respective outputs on Hall lines 504a–504c. When combined, e.g., into a 3-digit binary value 505, the outputs 504a–504c may form a succession of digital Hall states for brushless DC motor position feedback and commutation. The combined outputs are shown for rotation angles over a single rotation of an 8-pole brushless DC motor having Hall sensors 502a–502c placed 30, 60, or 120 degrees apart relative to the rotor. The three Hall outputs may correspond to rotor magnet movement in a motor that is moving at a desired speed. In certain embodiments, the motor used with the Hall sensors 502a–502c may be operating at a maximum speed as calculated above, with each state change transition period being equal to approximately 115 µs.

Stored position counter values and previous Hall state values are indicated at boxes 506–512. A time sequence of values for each box 506–512 is shown to the right of each particular box. Each value in a time sequence is shown directly underneath a corresponding time in the outputs on Hall lines 504a–504c. A noise-affected position counter value is shown at 506 as "Pos Counter (noise)". A comparison to a previous Hall state is shown at 508 as "Prev Hall Compare". An updated value of a previous Hall state is shown at 510 as "Prev Hall Update" and an actual value of the position counter in the absence of noise-induced transitions is shown at 512 as "Pos Counter (actual)".

With continued reference to FIG. 5, a state change pulse generator logic, e.g., logic means 418 of FIG. 4, is activated and a state change pulse is generated when Hall lines 504a–504c transition from two '0's to two '1's or vice versa. The state change pulse generator logic is also activated when the Hall lines transition from "000" to any valid Hall state transition. When a transition occurs in a Hall line and a state change pulse is generated, the new Hall state is compared to the value of the previous Hall state, e.g., Previous Hall Compare at 508, and if it is valid, a state change count pulse is generated. The position value stored in the position counter, e.g., a position counter register, may be updated in response to a valid Hall state transition.

When the Hall state transition is not an illegal or fault state (i.e. "000" or "111"), the Previous Hall Compare register is updated when a Hall state transition is detected after the Hall state validity comparison has been performed. A previous Hall value corresponding to the most recent Hall state value may be updated, e.g., in a register or other suitable storage means, as shown at 510. The value of the position counter as influenced by noise is shown at 506. Noise effects may be compared to the actual position counter at 512, which reflects the actual motor position. Based on the validity of a state change pulse or new Hall state, the position counter may be updated. The update may be as part of a method, e.g., as at step 318 in FIG. 3A, step 318a or step 318b of FIG. 3B, and/or by logic means, e.g. logic means 418 in FIG. 4. The values of the Previous Hall state and position counter may be stored in suitable memory means, including, but not limited to, one or more buffers, look up tables, registers, CDs, ROM, RAM, etc.

Operation of embodiments of the present invention will now be described with reference to FIGS. 3–9. As shown in FIG. 5, high frequency noise 514 that is injected into a Hall sensor output or line 504a from Hall sensor 502a is rejected or filtered out, e.g., prevented from affecting state counting for a brushless DC motor. The high frequency noise 514 has a relatively short time duration that does not produce a state change pulse. The high frequency noise 514 accordingly does not produce a change in the stored value of the position counter 506 or previous Hall state 508 or 510.

Hall sensor 502a of FIG. 5 may correspond, for example, to digital Hall sensor and sensor interface circuit 400 of FIG. 4. For such a case, high frequency noise, e.g., such as 514, at 416 would be prevented from passing through to the logic means 418 in FIG. 4 by the low pass filter 410. In this case, the interface output 404, connected to the logic means 418 would not see nor detect a Hall state transition in response to high frequency noise 514. Consequently, a position counter used for position feedback and the output of the motor commutation logic for a brushless DC motor would not be changed. High frequency noise injected at 404, for example due to internal switching noise or other such circuit-induced noise, would be prevented passing through the 500 ns digital glitch detector or discriminator.

Low frequency noise 516 that is able to pass, e.g., through the low pass filter 410 or comparison step 306, may introduce a transition in one or more Hall lines, e.g., at the input of the logic means 418. The low frequency noise 516 may cause a transition from "100" to "000" as shown in FIG. 5 by the vertical direction at 516 across the three Hall line outputs 504a–504c. As described previously for Table 1, "000" is an invalid Hall state that would not be encountered under normal motor position feedback or commutation operation. In another embodiment, e.g. method 300 of FIG. 3, high frequency noise occurring in a digital Hall sensor output 302 would be rejected at step 306 when a Hall state change pulse or transition is less than a specified time period.

When the noise 516 abates or goes away, the transition from "000" to "100" is again an invalid state as shown by a comparison at step 508. Once again, a state change count pulse is not generated, and the position counter does not change. Valid Hall states may be stored in suitable memory means, including, but not limited to, one or more buffers, read-only memory (ROM), random-access mmemor (RAM), software, and/or a table such as Table 1.

With continued reference to FIG. 5, low-frequency noise 518 injected in Hall line 504a is an example of when low frequency noise passes through a low pass filter, e.g., filter 410, and introduces a transition to a valid Hall state on a Hall line, e.g., one of the Hall signals at the input of the logic circuit 418. The noise 518 may cause a transition from "110" to "010", indicating a valid CW state change as shown in Table 1. Because the new, noise-induced Hall state "010" is valid, e.g., corresponds to a valid motor position, a state change count pulse is generated in the CW direction at step 506. The value of the previous Hall state, e.g., stored in the Previous Hall buffer, would then be updated to "010" at step 510. When the noise 518 goes away, a reverse transition from "010" to "110" occurs. Because the new Hall state "110" lasts longer than a specified time period, e.g., 500 ns, the new transition would not be rejected as being high frequency noise, e.g, the noise 518 would be received by logic means 418. A corresponding state change count pulse would be generated in the opposite (e.g., CCW) direction 510, allowing the position counter to correct the error or recover 512 from the noise injection 518. The Previous Hall buffer is then updated to the original "110" state.

Figure 6:
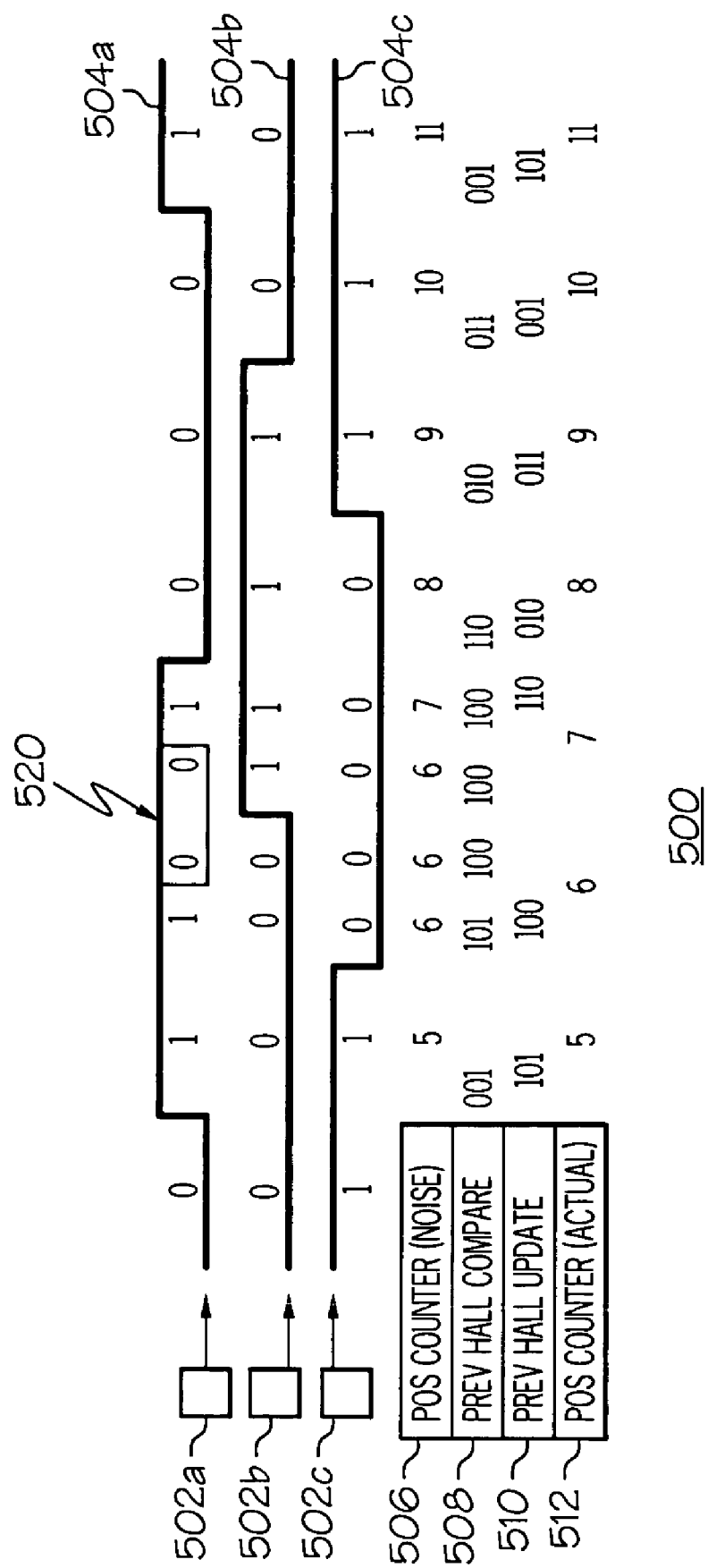
FIG. 6 shows a combined digital Hall sensor output from three Hall lines for noise injection in one Hall line with a noise-masked transition in another Hall line.

FIG. 6 shows the combined digital Hall sensor output from three Hall lines 504a–504c and method steps of FIG. 5 for noise injection in one Hall line 504a with a noise-masked transition in Hall line 504b. Injected noise 520 is an example of low frequency noise that has been introduced, e.g., passed through low pass filter 410, as a noise-induced Hall state on the signal from Hall line 504a during a real transition in Hall line 504b.

As shown in FIG. 6, noise 520 may be injected into Hall line 504a, resulting in a transition from Hall state "100" to an indicated Hall state "000". A state change pulse is not generated because the transition is from two 0's ("100") to two 0's ("000"). Consequently, the position counter does not change 506 and no state change count pulse is generated at step 506. Additionally, the Previous Hall buffer is not updated 510 because "000" is an illegal or fault state. When Hall line 504b transitions during its normal operation and the noise pulse 520 persists, the next Hall state becomes "010", which is an invalid state. As described previously, the transition from "000" to "010" is a transition from two 0's to two 0's, therefore no state change pulse is generated 508 at this point and no state change count pulse is generated 506. In this case, the Previous Hall buffer is not updated 510.

When the noise pulse 520 goes away, the next state becomes "110". The state change pulse is generated because the Previous Hall buffer value of "100", when compared to new Hall state value "110" at step 508, is a transition from two 0's to two 1's. A state change count pulse is generated because a transition from "100" to "110" indicates a valid transition. The Previous Hall value is updated, e.g., in a buffer, to "110" at step 510 and the position counter is incremented 512. The position counter has then recovered to the correct count and the noise-induced error is corrected, producing improved commutation and motor position feedback for the associated brushless DC motor.

Figure 7:
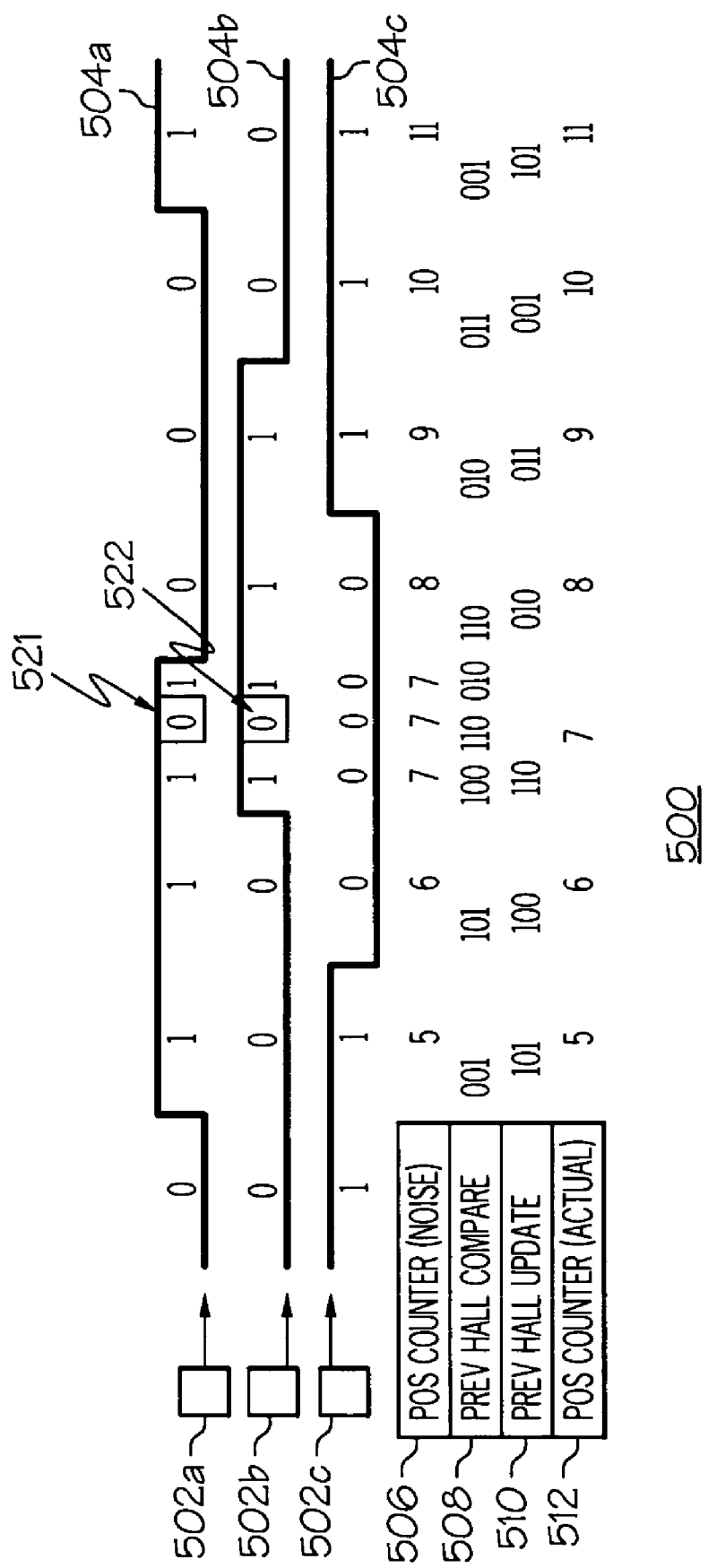
FIG. 7 shows a combined digital Hall sensor output from three Hall lines for noise injection in two Hall lines between transitions.

FIG. 7 shows the combined digital Hall sensor output from three Hall lines and the method steps of FIG. 5 for noise injection in two Hall lines between transitions. Injection noise pulses 521 and 522 are examples of low frequency noise pulses that have been introduced, e.g., passed through low pass filter 410, on two Hall lines, e.g., 504a and 504b, simultaneously.

In FIG. 7, noise pulses 521 and 522 are injected in Hall line 504a and Hall line 505b between two real transitions in each Hall line, producing a new Hall state of "000". Hall state "000" is an invalid or "Fault" state, and accordingly the position counter is not changed. As described previously, when a Hall state of "000" or "111" is introduced into the system, the Previous Hall buffer is not updated, as shown at step 510.

When the noise pulses 521 and 522 abate, the new Hall state "110" is compared to the Previous Hall buffer value of "110" at step 508. This comparison shows that the transition produced by the noise is neither a valid CW or CCW transition, and the position counter does not change. At the next transition, the new state "010" is compared to the Previous Hall buffer of "110" at step 508. A valid CW state transition is indicated by the comparison, e.g., by examining Table 1, and the position counter is incremented. The position counter consequently recovers to the correct count 512.

Figure 8:
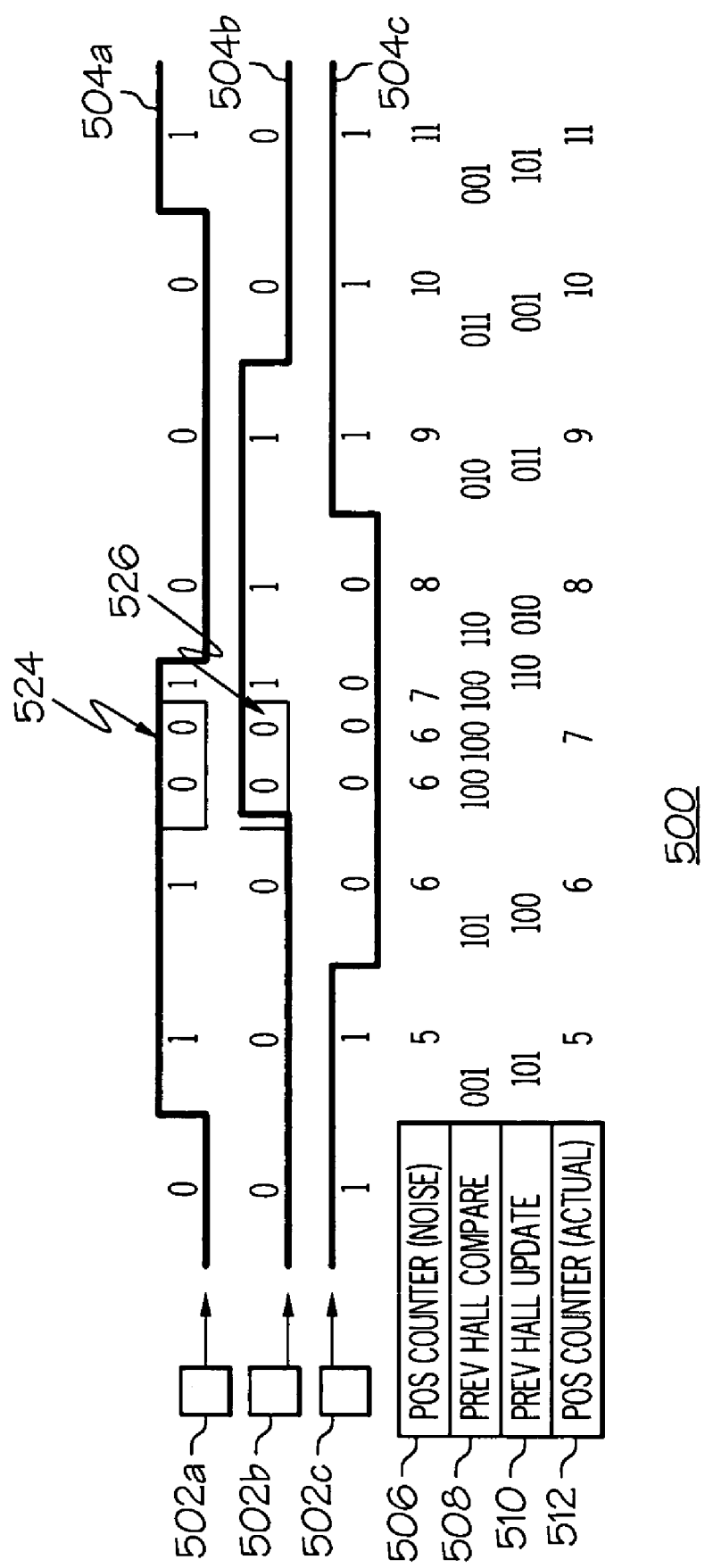
FIG. 8 shows a combined digital Hall sensor output from three Hall lines for noise injection in two Hall lines with a noise-masked transition occurring in one Hall line.

FIG. 8 shows a combined digital Hall sensor output from three Hall lines and method steps of FIG. 5 for noise injection in two Hall lines with a noise-masked transition occurring in one Hall line. Noise pulse 524 and 526 are injected in Hall line 504a and Hall line 504b, respectively, masking an actual transition in Hall line 504b. The Hall state produced by the double line noise injection, "000", is an invalid state, and the position counter does not change 506. The Previous Hall buffer value stays at "100" and is not updated 510 as shown.

When the noise pulses 524 and 526 go away, the next state becomes "110". A state change pulse is generated 506. Next, a state change count pulse is generated 512, since the Previous Hall buffer value is "100" and the transition is to a new Hall state value of "110", which is a valid transition, as shown in Table 1. The Previous Hall buffer is updated to "110" at step 510 and the position counter is incremented 512, thereby recovering to the correct position count.

Figure 9:
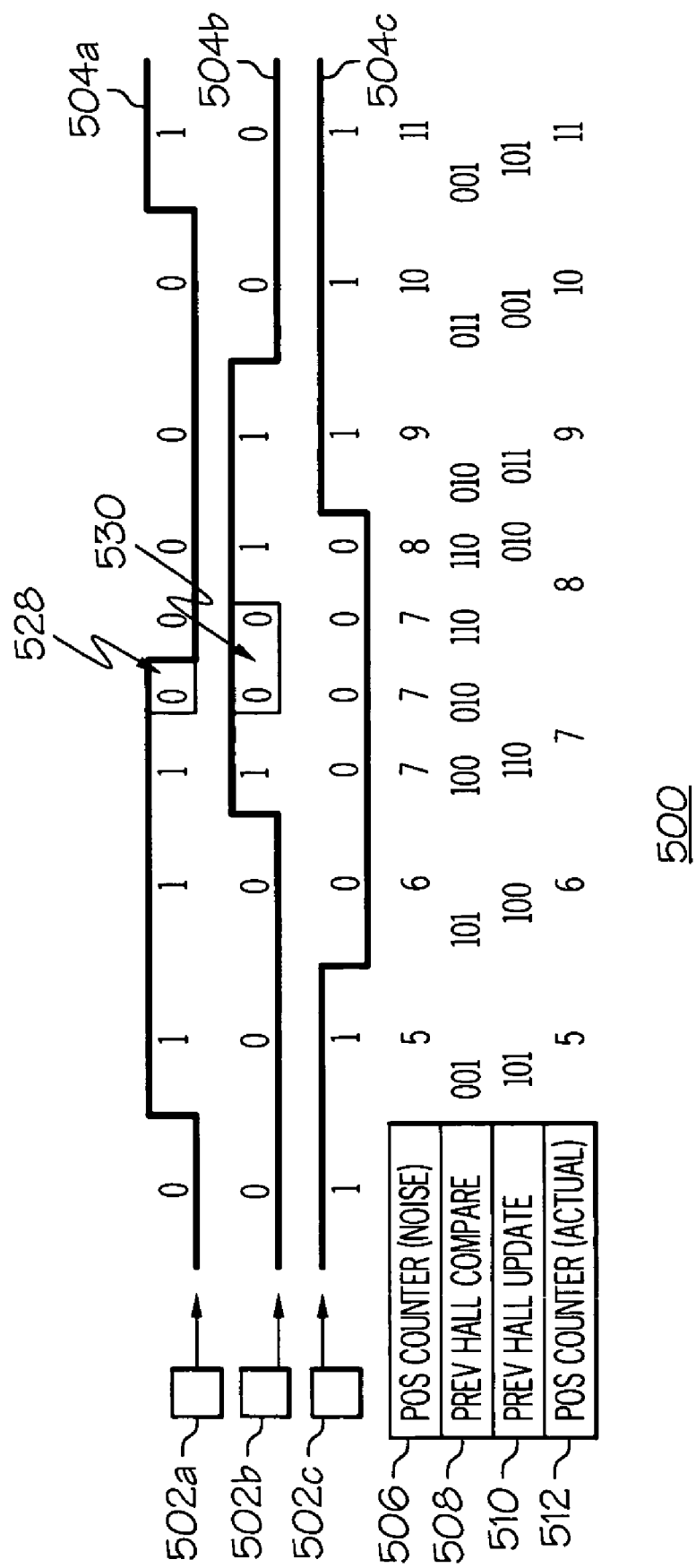
FIG. 9 shows a combined digital Hall sensor output from three Hall lines for noise injection in two Hall lines with alternate noise-masked transitions.

FIG. 9 shows a combined digital Hall sensor output from three Hall lines and method steps of FIG. 5 for noise injection in two Hall lines with alternate noise-masked transitions. In FIG. 9, Hall state "000" is an illegal or Hall "Fault" state, and the position counter does not change 506. When a Hall Fault or illegal state of "000" or "111" is introduced into the system, the Previous Hall buffer is not updated 510. When the Hall states changes from "000" to "010", a state change pulse is generated 506. A state change count pulse is generated 512 because the Previous Hall buffer value "110" when compared 508 to the new Hall state value "010" indicates a valid transition. The Previous Hall buffer is updated to "010" at 510 and the position count recovers from the noise injection.

From the description above, it may be seen that embodiments of the present invention provide the ability for motor state counting to recover from noise-induced Hall state transitions. Accordingly, motor position feedback and commutation for brushless DC motors may be enhanced and improved. In certain embodiments, two state change count pulses may be generated in response to noise-induced Hall state transitions between two "real" Hall state transistions. For noise that introduces a valid Hall state transition, a pulse may be generated for each noise-induced Hall state transition, i.e., in each indicated direction CW and CCW— thereby correcting a position counter by incrementing then decrementing, or vice versa, depending on the sequence. Noise pulses masking another valid Hall transition and introducing an invalid state or sequence may be ignored— without incrementing or decrementing a position counter— thereby preserving the actual position count. By validating a CW and CCW Hall state transition, a position counter, with noise injected into one or two Hall lines at the same time between any two "real" hall transitions, may recover to the correct counter value. Commutation and position feedback for brushless DC motors may be enhanced as a result.

Although the present invention has been described in considerable detail with reference to certain preferred version thereof, other versions are possible. For example, while the previous description has described use of three digital Hall sensors in brushless DC motor applications, one skilled in the art should understand that different numbers of such sensors may be used within the scope of the present invention. Furthermore, while certain directions of motor rotation have been associated with a positive increment value or negative decrement value for a position counter, it should be understood that these increment and decrement values may be assigned to the opposite directions of motor rotation.

The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise.

What is claimed is:

1. A method of incrementing a position counter comprising the steps of:
    detecting an indicated Hall state from a plurality of Hall effect sensors;
    detecting a duration of said indicated Hall state;
    comparing said duration to a specified time period;
    comparing said indicated Hall state to one or more valid Hall states, in the event that said duration is greater than said specified time period;
    determining whether said indicated Hall state corresponds to a valid Hall state;
    determining whether said indicated Hall state corresponds to first direction or second direction relative to a previous Hall state;
    changing a position counter in response to determining that said indicated Hall state corresponds to said first direction or said second direction; and
    ignoring said Hall state, in the event that said indicated Hall state corresponds to an invalid Hall position or said duration is less than said specified time period.

2. The method of claim 1, wherein said step of changing a position counter further comprises generating a state change pulse.

3. The method of claim 1, wherein said step of changing a position counter comprises incrementing said position counter.

4. The method of claim 1, wherein said step of changing a position counter comprises decrementing said position counter.

5. The method of claim 1, wherein said step of changing a position counter is in response to a clockwise direction of a rotor.

6. The method of claim 1, wherein said step of changing a position counter is in response to a counter clockwise direction of a rotor.

7. The method of claim 1, wherein said step of comparing said duration to a specified time period includes comparing said duration to a specified time period of about 500 nanoseconds.

8. The method of claim 1, wherein said step of detecting an indicated Hall state comprises the step of detecting an indicated Hall state that corresponds to a position of a rotor relative to a stator.

9. A computer-readable medium having computer-executable instructions stored thereon to perform the steps of:
    detecting an indicated Hall state from a plurality of Hall effect sensors;
    detecting a duration of said indicated Hall state;
    comparing said duration to a specified time period;
    comparing said indicated Hall state to one or more valid Hall states, in the event that said duration is greater than said specified time period;
    determining whether said indicated Hall state corresponds to a valid Hall state;
    determining whether said indicated Hall state corresponds to a first direction or a second direction relative to a previous Hall state;
    changing a position counter in response to determining that said indicated Hall state corresponds to said first direction or said second direction; and
    ignoring said Hall state, in the event that said indicated Hall state corresponds to an invalid Hall position or said duration is less than said specified time period.

10. The computer-readable medium of claim 9, wherein said computer-readable instructions to perform the step of changing a position counter further include instructions for incrementing said position counter.

11. The computer-readable medium of claim 9, wherein said computer-readable instructions to perform the step of changing a position counter further include instructions for decrementing said position counter.

12. The computer-readable medium of claim 9, wherein said computer-readable instructions to perform the step of changing a position counter include instructions for changing said position counter in response to a clockwise direction of a rotor.

13. The computer-readable medium of claim 9, wherein said computer-readable instructions to perform the step of changing a position counter include instructions for changing said position counter in response to a counter clockwise direction of a rotor.

14. The computer-readable medium of claim 9, wherein said computer-readable instructions to perform the step of comparing said duration to a specified time period include instructions for comparing said duration to a specified time period of about 500 nanoseconds.

15. The computer-readable medium of claim 9, wherein said computer-readable instructions to perform the step of changing a position counter include instructions for changing a position counter indicating a position of a rotor relative to a stator.

16. A system for incrementing a position counter comprising a logic device configured to:
   detect an indicated Hall state from a plurality of Hall effect sensors;
   detect a duration of said indicated Hall state;
   compare said duration to a specified time period;
   compare said indicated Hall state to one or more valid Hall states, in the event that said duration is greater than said specified time period;
   determine whether said indicated Hall state corresponds to a valid Hall state;
   determine whether said indicated Hall state corresponds to first direction or second direction relative to a previous Hall state;
   change a position counter in response to determining that said indicated Hall state corresponds to said first direction or said second direction; and
   ignore said Hall state, in the event that said indicated Hall state corresponds to an invalid Hall position or said duration is less than said specified time period.

17. The system of claim 16, wherein when changing a position counter, the logic device is configured to generate a state change pulse.

18. The system of claim 16, wherein when changing a position counter, the logic device is configured to increment said position counter.

19. The system of claim 16, wherein when changing a position counter, the logic device is configured to decrement said position counter.

20. The system of claim 16, wherein when comparing said duration to a specified time period, the logic device is configured to compare said duration to a specified time period of about 500 nanoseconds.

21. The system of claim 16, wherein when detecting the indicated Hall state, the logic device is configured to detect an indicated Hall state that corresponds to a position of a rotor relative to a stator.

* * * * *